United States Patent [19]

Chern et al.

[11] Patent Number: 5,749,927
[45] Date of Patent: May 12, 1998

[54] CONTINUOUS PROCESS TO PRODUCE LITHIUM-POLYMER BATTERIES

[75] Inventors: Terry Song-Hsing Chern, Midlothian, Va.; David Gerard Keller, Baltimore; Kenneth Orville MacFadden, Highland, both of Md.

[73] Assignee: W. R. Grace & Co. -Conn., New York, N.Y.

[21] Appl. No.: 653,172

[22] Filed: May 24, 1996

[51] Int. Cl.[6] .................................................. H01M 10/40
[52] U.S. Cl. ............................................ 29/623.5; 429/192
[58] Field of Search ............................. 429/192; 29/623.5

[56] References Cited

U.S. PATENT DOCUMENTS

| | | |
|---|---|---|
| 4,272,353 | 6/1981 | Lawrance et al. |
| 4,818,643 | 4/1989 | Cook et al. |
| 4,925,544 | 5/1990 | Goldring |
| 5,013,619 | 5/1991 | Cook et al. |
| 5,348,824 | 9/1994 | Duval |
| 5,424,151 | 6/1995 | Koksbang et al. |
| 5,508,129 | 4/1996 | Barker |

*Primary Examiner*—John S. Maples
*Attorney, Agent, or Firm*—Howard J. Troffkin

[57] ABSTRACT

Solid polymer electrolytes are extruded with active electrode material in a continuous, one-step process to form composite electrolyte-electrodes ready for assembly into battery cells. The composite electrolyte-electrode sheets are extruded onto current collectors to form electrodes. The composite electrodes, as extruded, are electronically and ionically conductive. The composite electrodes can be overcoated with a solid polymer electrolyte, which acts as a separator upon battery assembly. The interface between the solid polymer electrolyte composite electrodes and the solid polymer electrolyte separator has low resistance.

13 Claims, 1 Drawing Sheet

CONTINUOUS PROCESS TO PRODUCE LITHIUM-POLYMER BATTERIES

This invention was made with Government support under Contract DE-FC02-91CE50336 awarded by the United States Department of Energy. The Government has certain rights in this invention.

BACKGROUND OF THE INVENTION

1. Field of the Invention

The present invention relates to a continuous, one-step extrusion process for forming a solid polymer composite electrode.

2. Description of the Related Art

Storage batteries have a configuration composed of at least one pair of electrodes of opposite polarity, generally arranged in a series of adjacent electrodes of alternating polarity. The current flow between electrodes is maintained by an electrolyte composition capable of carrying ions between electrode pairs.

Non-aqueous batteries have certain distinct advantages over other types of storage batteries. They use light-weight metals, such as the alkali metals, as, for example, lithium. The metals are preferably in forms that are capable of intercalating within the structure of the conductive active materials used, preferably carbon. Typical metals and metal compounds include alkali metals and alkali metal compounds, such as lithium metal, lithium oxides, lithium-aluminum alloys and the like, which are at the far end of the electromotive series. These batteries have the potential for providing much higher specific (gravimetric) energy and volumetric energy densities (capacity per unit weight and volume, respectively) than other types of batteries.

The improved potential, in part, is due to the low atomic weight of the metals utilized, and the high potential for forming a battery in conjunction with suitable positive electrodes far removed in the electromotive series from the light weight metal (alkali metal) electrode. The battery can be formed in any conventional physical design, such as cylindrical, rectangular or disc-shaped "button" cells, normally of a closed cell configuration.

The battery components include positive electrodes, negative electrodes, and an insulating material capable of permitting ionic conductivity such as a porous separator membrane or a solid polymer electrolyte located between the electrodes. Batteries formed of these components can be in the form of alternating plates in a sandwich design, or of a continuously spirally-wound "jelly-roll" design, as are well known.

Electrolytes useful in such high energy battery systems can be formed of a non-aqueous solvent alone or as part of a fused or solid polymer electrolyte composition. Illustrative of known non-aqueous solvents include acetonitrile, tetrahydrofuran and its derivatives, ethylene carbonate, propylene carbonate, various sulfones and mixtures of these solvents. The electrolyte usually contains an appropriate, light-metal salt, such as the lithium salts described below.

Electrolytes in the form of a fused or solid (a material capable of retaining its form at ambient conditions) electrolyte composition are known from U.S. Pat. No. 5,219,679 to Abraham et al., the disclosure of which is incorporated herein by reference. The electrolyte, described generally as a solid polymer electrolyte (SPE), is a polymer-non-aqueous solvent matrix in which ions are conducted and which contain lithium ion ($Li^+$) exchange complexes.

The alkali-metal ion-exchange complexes utilize alkali metal (lithium) salts that are well known in the art of lithium battery production. The salts commonly used include, for example, $LiPF_6$, $LiAsF_6$, $LiCF_3SO_3$, and $LiClO_4$ and the like.

Liquids that have been utilized effectively in making the ion-exchange complexes of the SPE include the organic solvents, especially those that are aprotic, i.e., not prone to contributing a proton, such as ethylene carbonate, propylene carbonate, dimethyl carbonate, diethyl carbonate, dimethyl adipate, tetramethylene sulphone, γ-butyrolactone, dimethylformamide, dioctyl phthalate, dibutyl phthalate and the like.

Polymers typically used in SPE's include polyacrylonitrile (PAN), poly(tetraethylene glycol diacrylate) (PEGDA), poly(vinylidene difluoride) (PVDF) and poly(vinyl pyrrolidone) (PVP).

The known solid polymer electrolytes typically have been used to make batteries by sandwiching the SPE's between a cathode and an anode, as shown, for example, in U.S. Pat. No. 4,818,643, issued to Cook et al., which is incorporated herein by reference. Therein, a solid polymer electrolyte is sandwiched between a composite cathode disc and a lithium metal anode. The composite cathode disc is pressed from a mixture of polyethylene oxide and active cathode material.

The electrodes of a high energy battery are generally in the form of a metal foil (e.g. lithium metal foil) as the anodic electrode. Alternately, both anodic and cathodic electrode materials have been formed from compositions composed of electrochemically active and electrolytically conductive materials which are bound together by the presence of an inert polymer (e.g. polyolefins, polytetrafluoroethylene and the like). The polymer bonded electrodes are conventionally formed into porous structures which permit electrolyte material (such as electrolyte solvents) to enter the pores and aid in the ionic transfer.

Polymer bonded electrodes are normally formed by mixing the solid particulate components together with a polymer, such as tetrafluoroethylene, shaping the material by pressing and then sintering the material to form a fused porous product. Alternately, the active materials are mixed with a thermoplastic polymer, such as a polyolefin and an inert liquid such as hydrocarbon oil and then shaped by extrusion into a sheet product. The oil or other liquid material is removed by extraction to provide the resultant porous electrode product.

The known processes have the disadvantage of requiring the formation of a porous electrode which requires multiple processing steps to achieve.

Accordingly, the need exists for methods of producing battery electrodes which require a reduced number of process steps and to provide a solid battery electrode which provides ionic conductivity directly to the electrolyte composition of the battery system.

SUMMARY OF THE INVENTION

The present invention overcomes the deficiencies of the prior art, such as those noted above, by providing a one-step extrusion process for producing a composite solid polymer electrolyte-electrode. The present invention also provides the electrodes made by the process of the present invention, as well as a battery assembled from electrodes made according to the present invention.

The composite electrolyte-electrodes of the present invention are mixtures of active electrode materials and a solid polymer electrolyte composition. The process generally involves mixing the active electrode material with the solid polymer electrolyte components and extruding the mixture onto a current collector to form composite electrodes. The composite electrodes, as extruded, can be assembled into battery cell configurations.

According to a preferred embodiment, one or both electrodes can be coated with a layer of a solid polymer electrolyte composition prior to assembly into batteries.

DETAILED DESCRIPTION OF THE PREFERRED EMBODIMENTS

Figure 1:
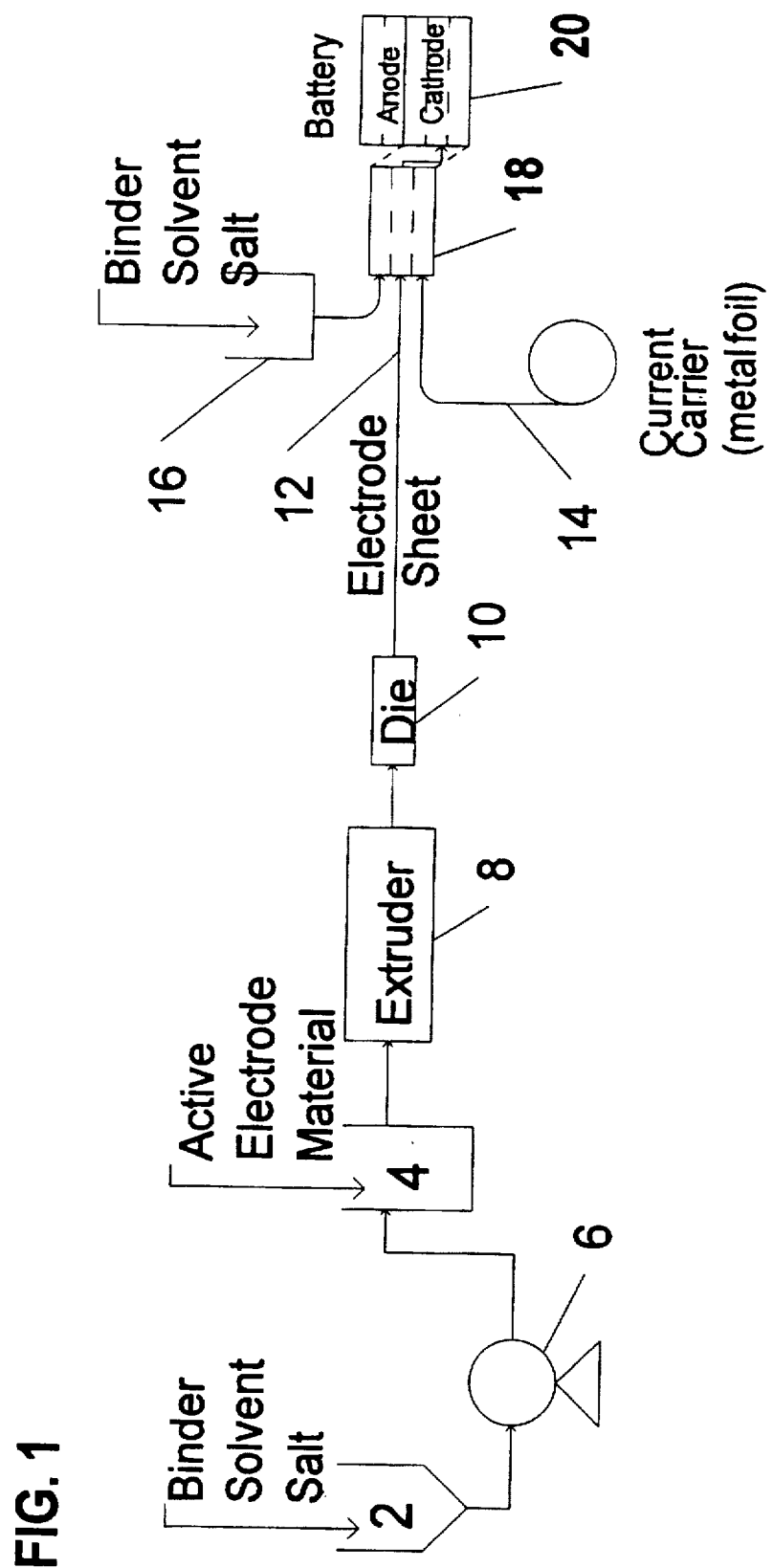
FIG. 1 is a block flow diagram showing a process according to a preferred embodiment of the present invention.

The present invention is directed to a single step extrusion process to form a novel solid polymer electrolyte-electrode composite. The instant process formed the desired electrode without the need for providing for porosity within the electrode product's structure.

The electrode-solid polymer electrolyte composite is formed by initially forming a substantially uniform mixture of electrochemically active and/or electrically conductive solid particulate material suitable for forming the desired electrode. For cathodes, suitable solid particulate materials are for example, metal chalcogenides having a metal selected from Ti, Zr, Hf, Nb, Cu, Fe, Ta, V, Mn, Cr, Co, Ni and mixtures of these metals alone or together with intercalated metals, such as lithium or sodium and up to 30 wt. % conductive carbon of particle size 1–100 nm. When the electrode being formed is an anode, the active material may be one wherein lithium can intercalate within the materials structure. Such materials include graphite, coke and the like.

In addition to the electrochemically-electrically conductive material, the feed composition is composed of solid polymer electrolyte components of a polymer binder, liquid and salt. The polymer binder can be any solid polymer electrolyte binder component capable of withstanding (being stable with respect to) the extrusion processing conditions, in particular the temperature shear and pressure conditions. The polymer binder must be electrochemically stable (inert) at normal battery operating conditions. These polymers are, for example, polyacrylonitrile (PAN), polyvinylidene difluoride (PVDF), polyvinylpyrrolidone (PVP) and the like and copolymers thereof. The preferred polymers are PAN and PVDF, with the most preferred material being PAN having a weight average molecular weight of at least about 150,000 for cathodes and PVDF is most preferred for anodes.

The liquid component of the feed can be any organic liquid capable of solvating the salt component and plasticize the polymer. Such solvents include, for example, ethylene carbonate, propylene carbonate, dimethyl carbonate, diethyl carbonate, dimethyl adipate, tetramethylene sulphone, γ-butyrolactone, dimethylformamide, dioctyl phthalate, and dibutyl phthalate, and mixtures thereof, for example. The preferred solvents are ethylene carbonate and propylene carbonate and most preferred are mixtures of ethylene carbonate and propylene carbonate in weight ratio of from 30:70 to 70:30 and most preferred in a 50:50 weight ratio.

The appropriate electrolyte salts are added to the feed. Most preferably the salts are the lithium salts, such as LiPF$_6$, LiAsF$_6$, LiCF$_3$SO, and LiClO$_4$ and the like. The salt may be added at any point in forming the feed. However, the preferred method is to add the salt to the solvent polymer and then adding this combination to the remaining dry components.

Referring to FIG. 1, a block flow diagram is shown representing a process according to a preferred embodiment of the present invention. Initially, the components of the solid polymer electrolyte composition are mixed in a mixer 2. The components include a binder, a liquid, and salt. The binder is a polymer, preferably PAN, PVDF or PVP. The liquid can preferably be any of the organic liquids noted above, or a mixture thereof, and especially the aprotic solvents, most preferably a 50:50 mixture of ethylene carbonate and propylene carbonate.

The liquid blend is added to a dry mixture of the selected active electrode material 4 via a pump 6, for example, and mixed. The active cathode material are alkali metal chalcogenides and mixed metal chalcogenides as described above. The preferred metal chalcogenides are manganese oxides in the form of lithiated and over-lithiated manganese oxide (e.g. Li$_x$Mn$_2$O$_4$ where x is 1 to 2, preferably 1 to 1.5 and most preferred about 1.3) which may be mixed with a fine particle size conductive material, such as micronized carbon. When the process is used for anode fabrication, the preferred anode materials are carbons capable of intercalating alkali metal ions, such as lithium ions. These are preferably graphite and coke material.

The mixed material is fed to an extruder 8 and formed through a die 10 to provide an electrode sheet 12. The electrode sheet is extruded onto a current collector 14 in the form of a conductive metal foil, screen, grid or the like, to form an electrode. The electrode, optionally, can be coated with a layer of a solid polymer electrolyte, made of a blend of a binder, a liquid, and a salt, as set forth above with respect to the solid polymer electrolyte. A battery 20 can then be assembled by layering two of the electrodes so formed having opposite polarities.

As noted above, the electrolyte-electrode composite can be extruded directly onto a current collector, such as a metal grid or foil, preferably aluminum foil for a cathode and copper foil for an anode. According to a preferred embodiment, the one-step extrusion process of the present invention is performed continuously.

The present invention provides electrodes fabricated according to the one-step extrusion processes above made up of novel solid polymer electrolyte-electrode composites. The composite electrodes can include either a cathode or an anode active material.

The present invention provides a single step extrusion process to form an electrode without the need for post-extrusion processing. Further, the present electrode-solid polymer electrolyte composite provides a solid product which has solid polymer electrolyte throughout the composite to permit intimate contact between the electrolyte composition and the electrochemically active material contained throughout the thickness of the formed electrode sheet product. Still further, the present electrode can be used in conjunction with a solid polymer electrolyte applied as a separate sheet or applied as a coating directly onto the present electrode sheet (as described above). This separate electrolyte sheet or electrolyte coating, when in contact with the present electrode will provide intimate contact therewith due to its affinity to the SPE contained as part of the present electrode. The SPE component of the presently formed electrode can be viewed as extending in a tortious manner throughout the thickness of the electrode from one of its major surfaces to the opposite surface.

The feed composition should be substantially the same as that of the resultant electrode. The electrochemically active and electrically conductive solid materials described above may be present in from about 40 to bout 80 weight percent of the total feed. When a cathode, the electrochemically active material provides at least about 70 weight percent of the solid material. When an anode, the conductive material forms at least about 50 to 80, preferably at least 60 weight percent of the solid material. The polymer described above can be present in from about 2 to about 10, preferably 3 to 6 weight percent of the total feed. The liquid component(s) described above can be from about 10 to about 40, preferably 15 to 30 weight percent of the total. The remainder of the feed can be composed of the SPE salt and other optional material, such as dispersants, colorants and the like. In certain instances the resultant electrode product may have somewhat lower amounts of liquid and, therefore, higher amounts of other components.

The composition optionally can also include additives, such as dispersants, to improve processing and the characteristics of the final product. A preferred dispersant is Hypermer® KD-1, available from ICI Americas, Inc. The dispersant optionally can be added into either of the premixed materials at steps 2 or 4 (preferred).

This invention provides for higher loading of active material in the electrodes, utilizing carbon capable of intercalating lithium ion to a higher degree, and enhances the interfacial relationship between the SPE and electrode. Batteries contemplated by the invention are made up of cathodes and anodes formed as set forth above.

The following non-limiting examples of preferred embodiments of the present invention are set forth by way of illustration, and are not meant to be a limitation on the invention defined by the claims appended hereto. All parts and percentages are by weight unless otherwise stated.

EXAMPLE 1

A cathode-electrolyte blend having the following composition was prepared:

| Component | wt % |
|---|---|
| Manganese oxide | 63 |
| Chevron acetylene black | 7.4 |
| LiPF$_6$ salt | 2.5 |
| Polyacrylonitrile | 4 |
| Ethylene carbonate | 11 |
| Propylene carbonate | 11 |
| Hypermer ® KD-1 (optional) | 1.2 |

The composition was prepared as follows: In one mixer, the dry particulate manganese oxide and carbon black were blended together, for example, in a fluidized bed. In a separate, heated mixer, the salt, PAN, EC, PC, and, optionally, a Hypermer®, were blended together to form a diluted SPE solution. The solution was mixed at a temperature of from 120°–150° Centigrade. The dilute SPE solution and the dry particulate mix were then combined and introduced into an extruder. The still-warm mixture was extruded, in sheets, for example, to form the composite electrolyte-electrodes.

EXAMPLE 2

A layer of solid polymer separator for coating onto a composite electrolyte-electrode had the following formulation:

| Component | wt % |
|---|---|
| LiPF$_6$ salt | 14 |
| Polyacrylonitrile | 11 |
| Ethylene carbonate/propylene carbonate | 75 |

The electrolyte-cathode film from Example 1 was coated with a film of the extruded solid polymer separator above to form a laminate of solid polymer separator and composite electrolyte-electrode that was ready for assembly into cells, to form a battery, for example. Preferably, the solid polymer separator film and the extruded composite electrolyte-electrode layer were still warm when they are brought together.

Advantageously, substantial intermixing took place at the interface of the cathode composition and the solid polymer separator when the two similarly-composed extrusion layers were brought into contact while still warm. Accordingly, the surfaces of the two layers blended together to form an "interfaceless" laminate that was ready for assembly into cells.

EXAMPLE 3

An anode-electrolyte composite blend having the following composition was prepared:

| Component | wt % |
|---|---|
| Coke | 67.4 |
| LiPF$_6$ salt | 2.5 |
| Polyacrylonitrile | 4 |
| Ethylene carbonate | 11 |
| Propylene carbonate | 11 |
| Hypermer ® KD-1 (optional) | 1.2 |

The anode also can be coated with a solid polymer separator as was the cathode in Example 2 above. The anode and cathode films can be used in a plate-type or jelly-roll battery.

Although the present invention has been described in relation to particular embodiments thereof, many other variations and modifications and other uses will become apparent to those skilled in the art. The present invention is to be limited not by the specific disclosure herein, but only by the appended claims.

What is claimed is:

1. A process for forming a solid polymer electrolyte-electrode product comprising the step of:
   extruding a mixture of a solid active electrode material with a solid polymer electrolyte composition to provide an extruded composite; and
   coating the composite with a layer of a solid polymer separator.

2. The process of claim 1, wherein the solid polymer electrolyte composition includes a salt, a binder, and a solvent.

3. The process of claim 1, further comprising the step of extruding the mixture onto a current carrier to form a composite electrode.

4. The process of claim 1, wherein the steps are performed continuously.

5. The process of claim 1, wherein the step of coating the composite electrode is performed subsequent to the step of extruding the mixture of active electrode material and the solid polymer electrolyte so as to form an interfaceless laminate.

6. The process of claim 5, wherein the solid polymer separator includes a salt, a binder, and a solvent, and the salt, binder and solvent in the solid polymer separator include the same compounds as the salt, the binder and the solvent of the solid polymer electrolyte.

7. The process of claim 1, wherein the steps are performed continuously.

8. The process of claim 1, wherein the solid polymer electrolyte of the composite electrode is ionically conductive.

9. The process of claim 1, wherein the polymer of the solid polymer electrolyte composition comprises polyacrylonitrile, or polyvinylidene difluoride.

10. The process of claim 2, wherein the solvent is selected from the group consisting of ethylene carbonate, propylene carbonate, dimethyl carbonate, diethyl carbonate, dimethyl adipate, tetramethylene sulphone, γ-butyrolactone, dimethylformamide, dioctyl phthalate, and dibutyl phthalate.

11. The process of claim 1, wherein the solid active electrode material is in the form of a particulate.

12. The process of claim 1, wherein the solid active electrode material is a metal oxide.

13. The process of claim 1, wherein the solid active electrode material is a graphite or coke.

* * * * *